US 9,708,012 B2

United States Patent
Mauduit et al.

(10) Patent No.: US 9,708,012 B2
(45) Date of Patent: Jul. 18, 2017

(54) ARRANGEMENT FOR A MECHANICAL BASE STRUCTURE OF A MOTOR VEHICLE HAVING AN ENCLOSURE CONTAINING A DEVICE FOR CONTROLLING A CIRCUIT BREAKER

(71) Applicant: RENAULT s.a.s., Boulogne Billancourt (FR)

(72) Inventors: Thomas Mauduit, Plaisir (FR); Guillaume Camus, Guyancourt (FR); Olivier Bisror, Le Plessis Robinson (FR)

(73) Assignee: RENAULT s.a.s., Boulogne Billancourt (FR)

( * ) Notice: Subject to any disclaimer, the term of this patent is extended or adjusted under 35 U.S.C. 154(b) by 50 days.

(21) Appl. No.: 14/653,523

(22) PCT Filed: Dec. 5, 2013

(86) PCT No.: PCT/EP2013/075675
§ 371 (c)(1),
(2) Date: Jun. 18, 2015

(87) PCT Pub. No.: WO2014/095394
PCT Pub. Date: Jun. 26, 2014

(65) Prior Publication Data
US 2015/0344077 A1  Dec. 3, 2015

(30) Foreign Application Priority Data
Dec. 18, 2012 (FR) ...................... 12 62216

(51) Int. Cl.
*B62D 25/20* (2006.01)
*B60L 3/00* (2006.01)

(52) U.S. Cl.
CPC ........ *B62D 25/2063* (2013.01); *B60L 3/0084* (2013.01); *B62D 25/20* (2013.01)

(58) Field of Classification Search
CPC .... B60D 25/20; B60D 25/2063; B60L 3/6084
See application file for complete search history.

(56) References Cited

U.S. PATENT DOCUMENTS

2011/0297467 A1* 12/2011 Iwasa ................ B60K 1/04
180/65.31

FOREIGN PATENT DOCUMENTS

| EP | 2 402 192 | 1/2012 |
|---|---|---|
| JP | 06 344950 | 12/1994 |

(Continued)

OTHER PUBLICATIONS

International Search Report Issued Jan. 10, 2014 in PCT/EP2013/075675 filed Dec. 5, 2013.

*Primary Examiner* — John Walters
*Assistant Examiner* — James Triggs
(74) *Attorney, Agent, or Firm* — Oblon, McClelland, Maier & Neustadt, L.L.P.

(57) ABSTRACT

An arrangement for an electric traction or hybrid motor vehicle, which includes: at least one portion of a passenger compartment of the vehicle, a mechanical base structure defining a bottom of the passenger compartment portion, and an electrical device controlling a fuse, configured to be combined with a power supply battery that supplies electrical power to an electric traction engine of the vehicle. The mechanical base structure includes a recess accessible from the passenger compartment portion. The arrangement includes an enclosure that contains the device for controlling a fuse and is attached in the recess such that the device for controlling a fuse is accessible from the passenger compartment portion.

11 Claims, 5 Drawing Sheets

(56) References Cited

FOREIGN PATENT DOCUMENTS

| | | |
|---|---|---|
| JP | 07 156826 | 6/1995 |
| JP | 2000 001147 | 1/2000 |
| JP | 2000 038035 | 2/2000 |

* cited by examiner

ARRANGEMENT FOR A MECHANICAL BASE STRUCTURE OF A MOTOR VEHICLE HAVING AN ENCLOSURE CONTAINING A DEVICE FOR CONTROLLING A CIRCUIT BREAKER

TECHNICAL FIELD OF THE INVENTION

The invention relates to an arrangement for an electric traction or hybrid motor vehicle, comprising:
- at least one portion of the passenger compartment of said vehicle, in particular a front portion of the passenger compartment,
- a mechanical base structure delimiting the bottom of said portion of the passenger compartment,
- an electrical device for controlling a circuit breaker, said device being configured so as to be joined to a power supply battery supplying electrical power to an electric traction motor of said vehicle.

PRIOR ART

Usually, an electric traction or hybrid motor vehicle comprises at least one electric traction motor supplied with electrical energy by at least one power battery integral with the vehicle. In order to provide a regulatory safety mechanism from an electrical viewpoint, the motor vehicle is normally equipped with a device for controlling a circuit breaker, said device being connected to the power battery. The manual actuation of the device for controlling a circuit breaker, which may take the form of a fuse, for example connected to the housing of the power battery, makes it possible to selectively activate or deactivate the electrical power supply conferred by the power battery. It is known to install such a device for controlling a circuit breaker at a rear wheel arch or in a tunnel in the mechanical base.

The problem here is the lack of protection of the device for controlling a circuit breaker, the lack of reliability of access to the device for controlling a circuit breaker when needed (for example in the case that the vehicle is worked on by a repairer or a firefighter), the lack of conferred safety (in particular on account of the possibility of access to the device for controlling a circuit breaker by a child or at least by an unauthorized person), and the lack of reliability over time, in particular with regard to the seal with respect to the device for controlling a circuit breaker.

OBJECT OF THE INVENTION

The object of the present invention is to propose an arrangement for an electric traction or hybrid motor vehicle that overcomes the above-listed disadvantages.

In particular, one object of the invention is to provide such an arrangement, making it possible to improve:
- the protection of the device for controlling a circuit breaker,
- the reliability of access to the device for controlling a circuit breaker when needed, for example in the case that the vehicle is worked on by a repairer or firefighter,
- the safety conferred by the arrangement, in particular by eliminating the possibility of accessing the device for controlling a circuit breaker by a child or at least by an unauthorized person,
- the reliability over time of the arrangement, in particular with regard to the seal with respect to the device for controlling a circuit breaker.

These objectives are achieved by an arrangement for an electric traction or hybrid motor vehicle, comprising:
- at least one portion of the passenger compartment of said vehicle, in particular a front portion of the passenger compartment,
- a mechanical base structure delimiting the bottom of said portion (A) of the passenger compartment,
- an electrical device for controlling a circuit breaker configured so as to be joined to a power supply battery supplying electrical power to an electric traction motor of said vehicle, the mechanical base structure comprising a recess accessible from said portion of the passenger compartment and the arrangement comprising an enclosure that contains said device for controlling a circuit breaker and that is fixed in said recess such that said device for controlling a circuit breaker is accessible from said portion of the passenger compartment.

The enclosure may comprise on the one hand a housing fixed to the mechanical base structure in said recess, in particular by riveting, in which housing said device for controlling a circuit breaker is disposed, and on the other hand a cover accessible from said portion of the passenger compartment and mounted removably in relation to the housing such that the cover varies between a first and a second configuration, in which, respectively, it prevents and allows a person access to said device for controlling a circuit breaker from said portion of the passenger compartment.

The housing and the cover, in particular made of a metal material, are configured such that the enclosure forms, in the first configuration of the cover, a Faraday cage within which said device for controlling a circuit breaker is placed, and isolates said portion of the passenger compartment from a magnetic field emitted by said device for controlling a circuit breaker.

The enclosure may comprise at least one assembly device between the cover and the housing able to occupy a locking state blocking the cover on the housing in the first configuration of the cover and an unlocking state allowing the cover to pass into the second configuration, each assembly device comprising an electrically conductive element configured so as to assure an electrical continuity between the housing and the cover in the locking state of the assembly device.

The housing and/or the cover may comprise zones free from an electrophoretic treatment, and each electrically conductive element is then in contact with said zones.

The enclosure may comprise at least one gasket placed between the cover and the housing in the first configuration of the cover and each assembly device comprises clamping elements automatically drawing the cover and the housing together as each assembly device passes into the locking state so as to assure that the gasket is compressed.

This can be performed such that, from a side opposite the cover, the housing has an opening communicating between the interior and exterior of the enclosure and through which part of the device for controlling a circuit breaker passes.

The arrangement may comprise a power supply battery intended to supply electrical power to an electric traction motor of the vehicle, and said device for controlling a circuit breaker can be connected to the power battery.

The enclosure may comprise structural elements configured such that the enclosure constitutes a removable structural portion of the vehicle chassis able to be fixed to a non-removable portion of the chassis formed by the mechanical base structure such that the assembly formed by the mechanical base structure and the enclosure fixed in the recess formed in the mechanical base structure forms a structural floor of the chassis in said portion of the passenger compartment.

The arrangement may comprise a seat for a front passenger fixed to the mechanical base structure and disposed in said portion of the passenger compartment, and the enclosure may be arranged in front of said seat in a longitudinal direction of the arrangement corresponding to the direction of travel of the vehicle.

SUMMARY OF THE DRAWINGS

Further advantages and features will become clearer from the following description of particular embodiments of the invention provided by way of non-limiting example and shown in the accompanying drawings, in which.

PREFERRED EMBODIMENTS OF THE INVENTION

The invention, which relates to an arrangement 10 for an electric traction or hybrid vehicle as described above, will be described hereinafter with reference to FIGS. 1 to 5.

For greater clarity, a coordinate system associated with the arrangement is defined, with a longitudinal direction designated "X" corresponding to the front/rear direction of travel of the motor vehicle as it is driven forwards or is driven in reverse, a transverse direction designated "Y" corresponding to the horizontal left/right direction perpendicular to the longitudinal direction X, and a vertical direction designated "Z" corresponding to the vertical direction jointly perpendicular to the longitudinal direction X and transverse direction Y.

Generally, and as shown in FIGS. 2 to 5, the arrangement 10 for an electric traction or hybrid motor vehicle comprises:
  at least one portion A of the passenger compartment of said vehicle,
  a mechanical base structure 11 delimiting the bottom of said portion A of the passenger compartment,
  and an electrical device for controlling a circuit breaker 12 (shown solely in FIG. 5) configured so as to be joined electrically to a power supply battery (not shown) supplying electrical power to an electric traction motor (not shown) of the vehicle.

The device for controlling a circuit breaker 12 therefore is not a simple conventional onboard electronic fuse of the vehicle, but on the contrary has all the technical features, for example a power capacity, amp intensity and voltage capacity, allowing it to perform its function in relation to a power battery.

In particular the portion of the passenger compartment is a front A portion of the passenger compartment in the longitudinal direction X. The passenger compartment corresponds to a zone of the vehicle intended to accommodate the transported individuals. It is delimited downwardly in the direction Z by the portion of the chassis forming the mechanical base of the chassis, in the direction X by the dashboard and the windscreen (not shown), rearwardly in the direction X by the luggage compartment or equivalent (not shown), and possibly upwardly by a roof or ceiling (not shown) of the vehicle. The passenger compartment is also delimited on the lateral sides in the direction Y by the presence of the side doors (not shown) of the vehicle.

The mechanical base structure 11, from the opposite side in the vertical direction Z in relation to the portion A of the passenger compartment delimited upwardly in the vertical direction Z by said mechanical base structure, delimits downwardly the portion B from below the vehicle forming the ride height of the vehicle when the latter is on the ground.

In accordance with an essential feature of the arrangement 10, the mechanical base structure 11 comprises a recess 13 (FIG. 5) accessible from the portion A of the passenger compartment, and the arrangement 10 comprises an enclosure 14 (visible in detail in FIG. 1) that contains the device for controlling a circuit breaker 12 and that is fixed in the recess 13 such that the device for controlling a circuit breaker 12 is accessible from the portion A of the passenger compartment, from above the mechanical base structure 11 in the direction Z.

Figure 1:
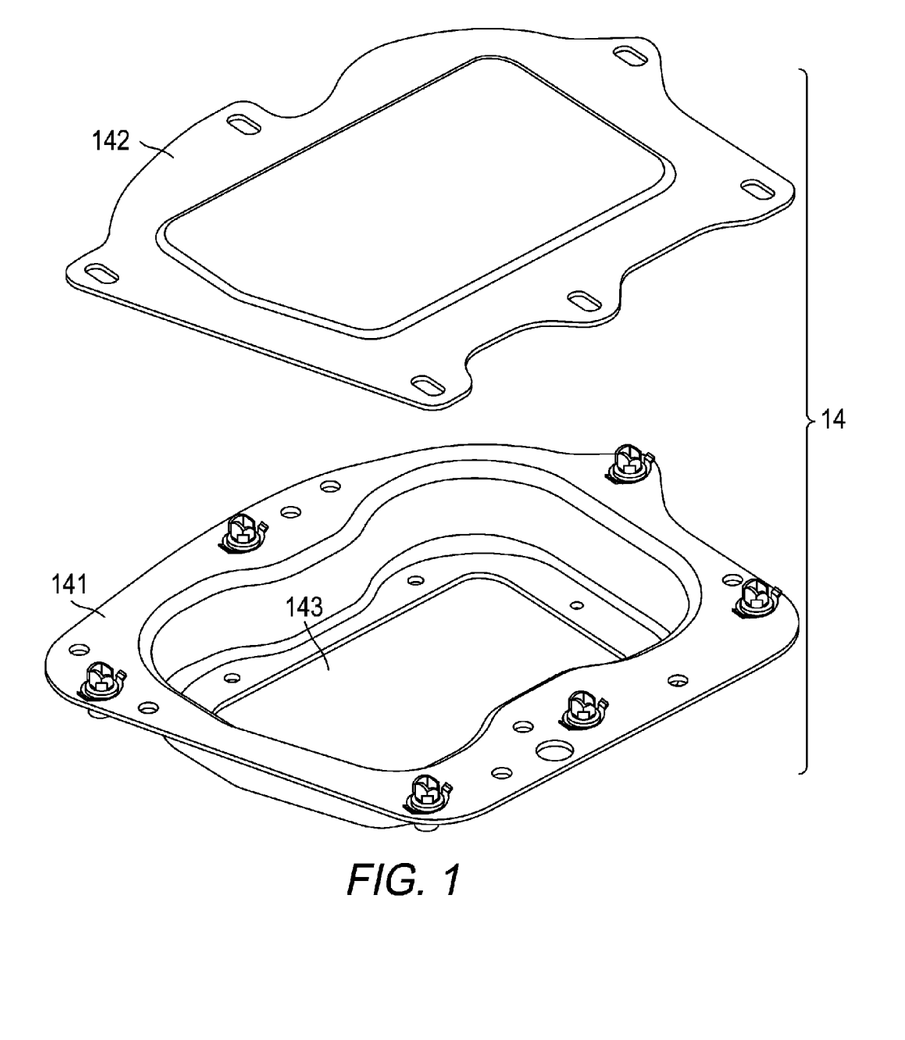
FIG. 1 is an exploded view of an exemplary enclosure for an arrangement according to the invention.

With reference to FIG. 1, the enclosure 14 comprises on the one hand a housing 141 fixed to the mechanical base structure 11 in the recess 13, and on the other hand a cover 142 accessible from the portion A of the passenger compartment and mounted removably in relation to the housing 141 such that the cover 142 varies between:
  a first configuration (FIGS. 2 and 4) in which it prevents a person from accessing the device for controlling a circuit breaker 12 from the portion A of the passenger compartment,
  and a second configuration (FIG. 3) in which it allows a person to access the device for controlling a circuit breaker 12 from the portion A of the passenger compartment.

The device for controlling a circuit breaker 12 is disposed in the housing 141. The base of the housing 141, i.e. from the side opposite the zone of the housing 141 intended to be in contact with the cover 142 when it is in place in the first configuration, may be solid (in a manner not shown) or on the contrary it may be, in the manner shown, that on a side opposite the cover 142, the housing 141 has an opening 143 communicating between the interior and exterior of the enclosure 14, through which opening a portion of the device for controlling a circuit breaker 12 passes.

Figure 2:
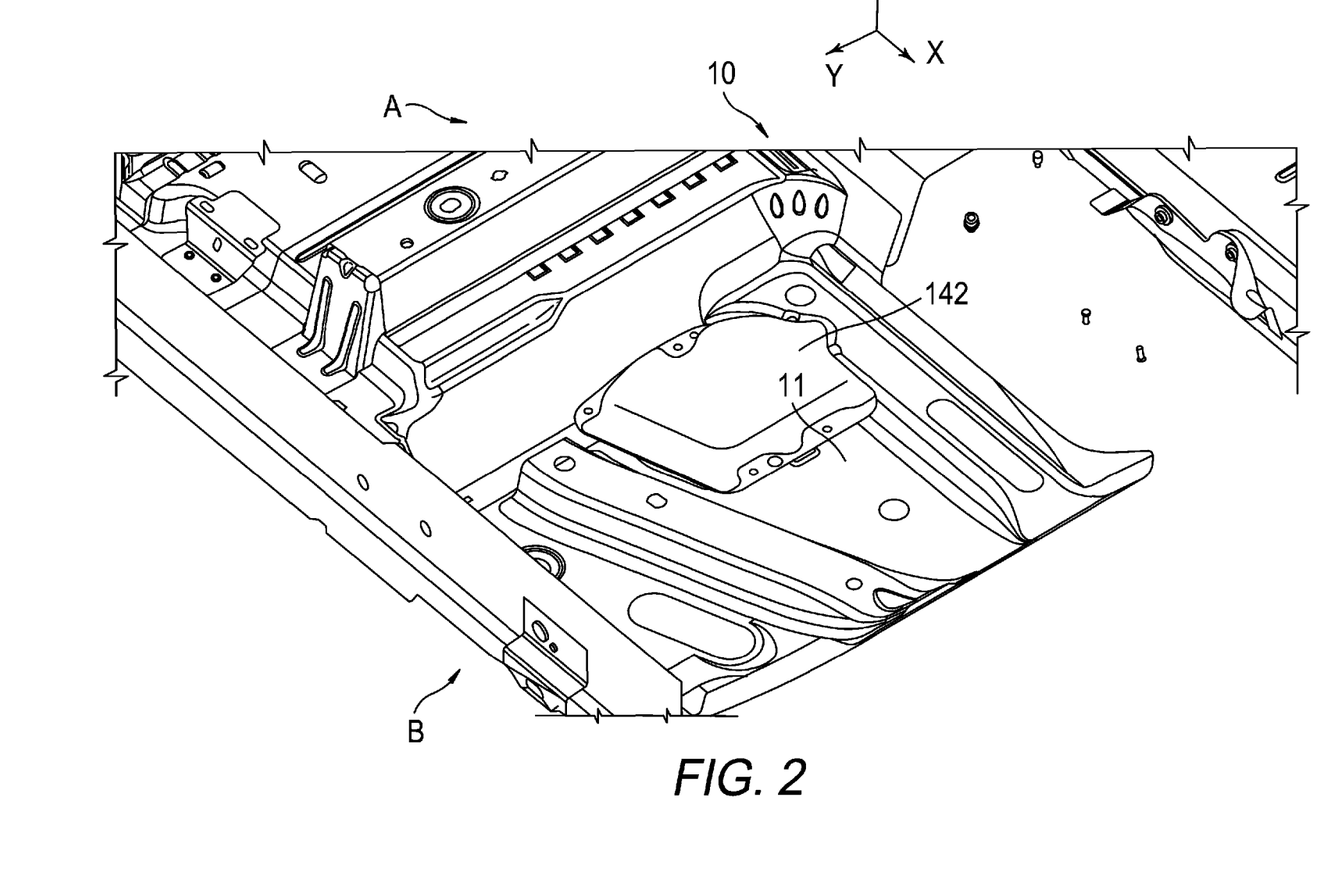
FIG. 2 is a perspective view from above of an exemplary arrangement according to the invention, comprising an enclosure according to FIG. 1.
Figure 3:
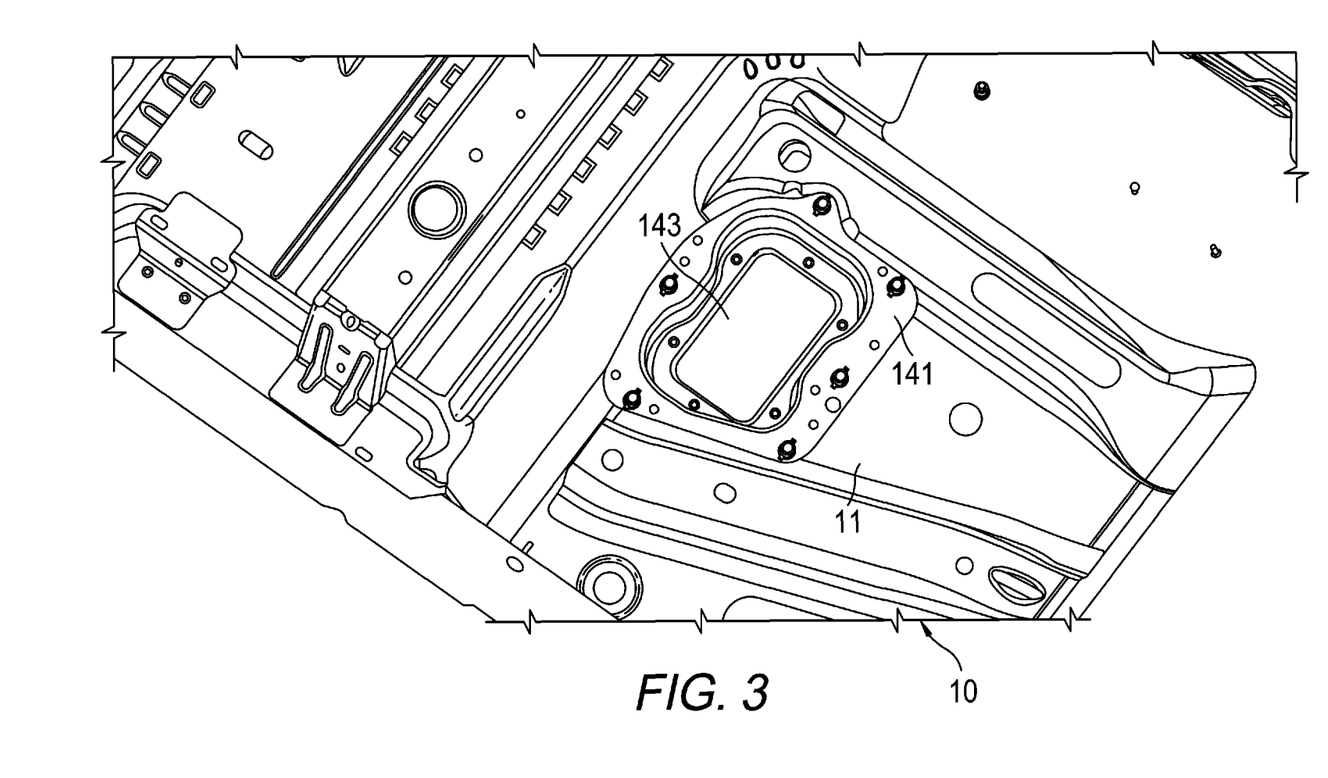
FIG. 3 is a view similar to FIG. 2, the cover of the enclosure being removed.
Figure 4:
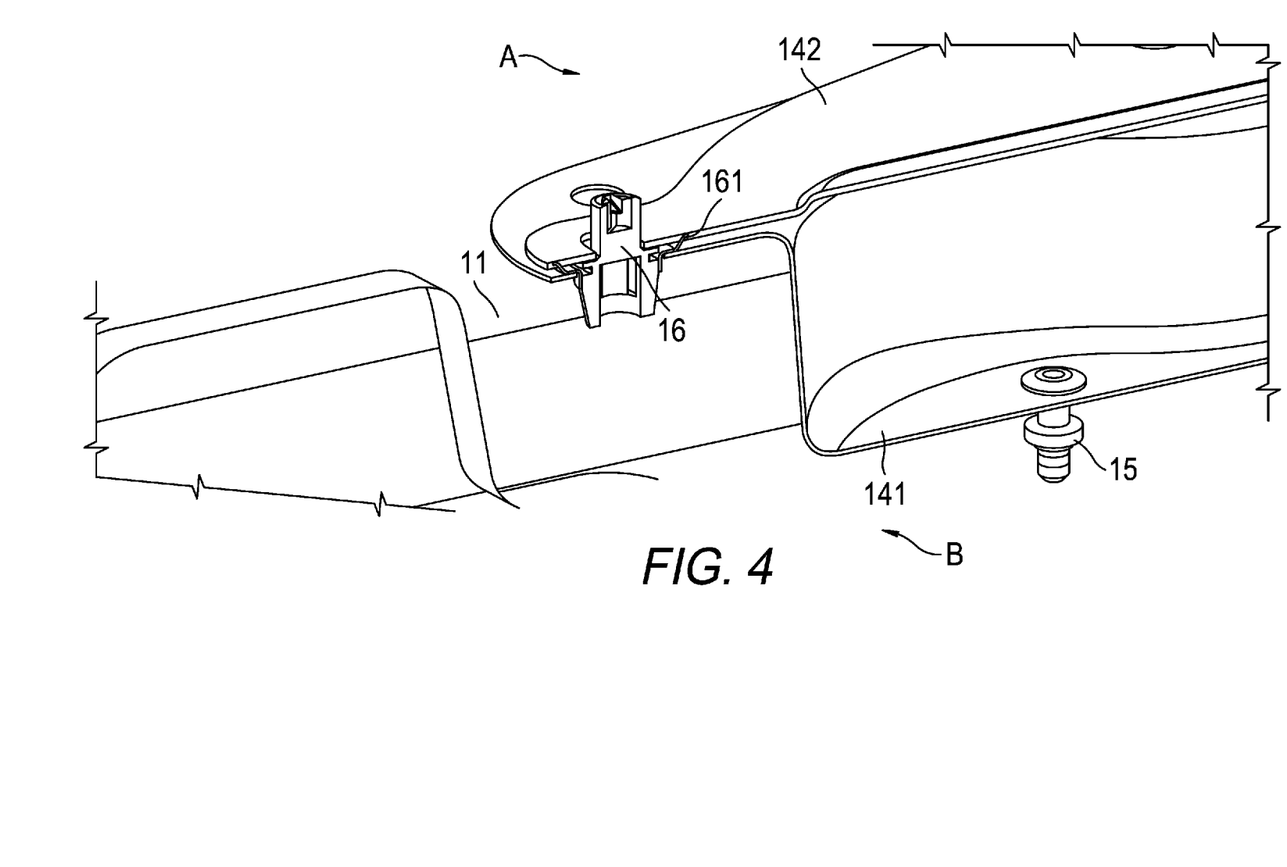
FIG. 4 is a sectional view, along a longitudinal-vertical plane passing through the enclosure, of the arrangement of FIGS. 2 and 3.

FIGS. 2 and 4 thus show, from the side of the portion A of the passenger compartment, that the cover 142 is in a position accessible from the passenger compartment whilst ensuring the closure of the enclosure 14 upwardly in the direction Z, in the direction of the portion A of the passenger compartment. This corresponds to the first configuration. On the contrary, FIG. 3 corresponds to the second configuration in which the cover 142 is removed from the housing 141 in order to give access from above in the direction Z, from the portion A of the passenger compartment, to the interior of the enclosure 14, in particular to allow access to the device for controlling a circuit breaker 12.

Figure 5:
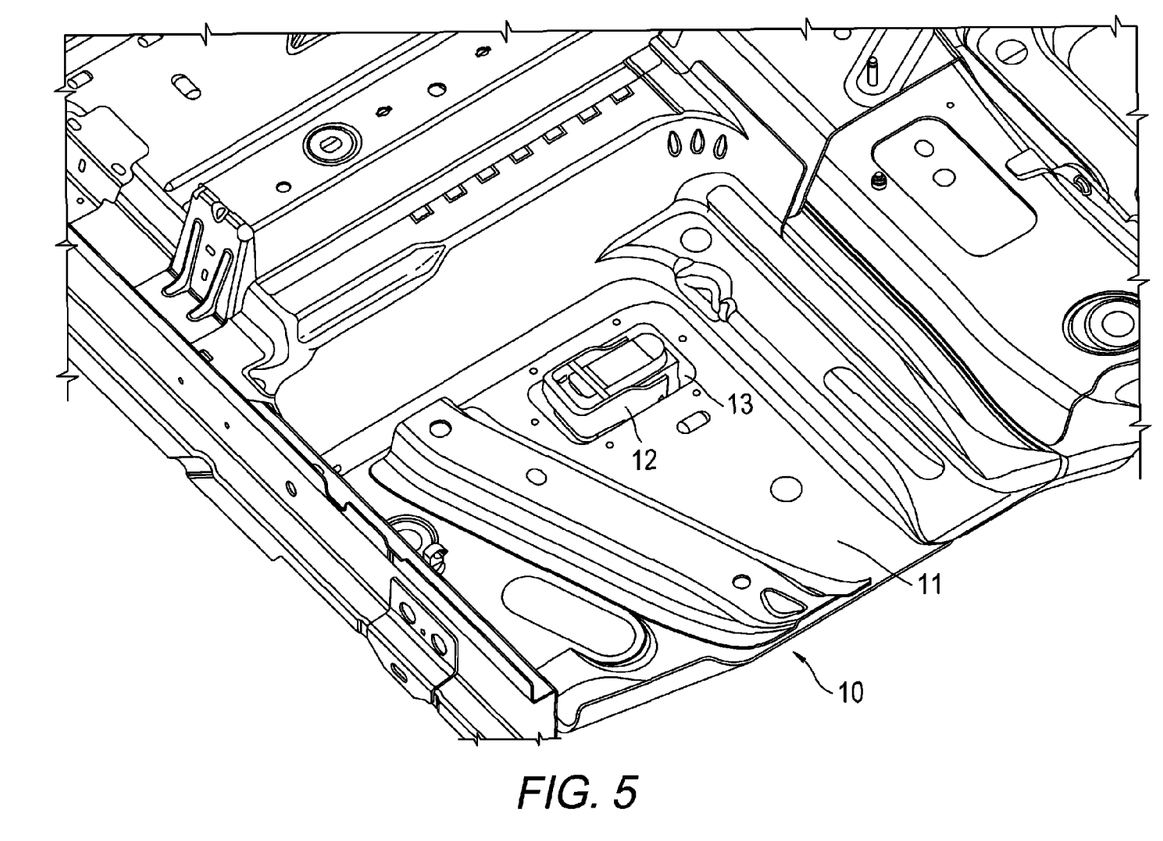
FIG. 5 shows a portion of the arrangement in accordance with the previous figures, the enclosure of FIG. 1 being removed.

In FIG. 5, by contrast, the entire enclosure 14 is removed outside the recess 13 so as to make it possible to illustrate the presence of the device for controlling a circuit breaker 12. Thus, it can be seen that the mechanical base structure 11 is emptied so as to allow at least a portion of the device for controlling a circuit breaker 12 to pass upwardly in the direction Z in the direction of the portion A of the passenger compartment. For example, the device for controlling a circuit breaker 12 can extend, through this aperture, proceeding from the portion B below the mechanical base structure 11 and/or from the thickness of the mechanical base structure 11.

The housing 141 can be fixed on the mechanical base structure 11 by any means, whether reversible or permanent, assuring a reliable fixing of the housing 141. One solution is provided in particular by riveting, which provides good results in terms of reliability, simplicity and quality of the fixing. FIG. 4 shows one of the six rivets 15. This solution also means that there is no need for a gasket between the housing 141 and the mechanical base structure. This seal is assured by applying a filler to the zone and to the rivet heads.

The housing 141 and the cover 142 can be made of any sufficiently rigid material. However, they are advantageously made in particular of a metal material and are configured such that the enclosure 14 forms, in the first configuration of the cover 142, a Faraday cage within which the device for controlling a circuit breaker 12 is placed. This Faraday cage isolates the portion A of the passenger compartment from any magnetic field likely to be emitted by the device for controlling a circuit breaker 12 from inside the enclosure 14.

The enclosure 14 comprises at least one assembly device (FIG. 4) between the cover 142 and the housing 141 able to occupy a locking state blocking (FIGS. 2 and 4) the cover 142 on the housing 141 in the first configuration of the cover 142 and an unlocking state allowing the cover 142 to pass into the second configuration (FIG. 3). In one particular embodiment each assembly device 16 advantageously comprises an electrically conductive element 161, for example in the form of a spacer, configured so as to assure an electrical continuity between the housing 141 and the cover 142 in the locking state of the assembly device. Such an assembly device 16 and such an electrically conductive element 161 may assume any design suitable for the functions thereof. The structure illustrated in FIG. 4 is thus merely a non-limiting exemplary embodiment. The electrically conductive element 161 makes it possible, by means of the electrical continuity that it confers, to provide an enclosure 14 forming a Faraday cage.

During the manufacture of the enclosure 14, an electrophoretic treatment of the housing 141 and of the cover 142 could be provided. However, the housing 141 and/or the cover 142 will comprise zones free from this electrophoretic treatment. The electrically conductive element 161 is then in contact with said zones free from such a treatment so as to assure the electrical continuity between the housing 141 and the cover 142 as detailed above.

The assembly device may be formed by a plurality of screws, for example of the quarter turn type, distributed over the circumference of the cover 142. The screws each comprise a cross-shaped impression for a universal key of the firefighter type.

The arrangement 10 may also comprise a seat (not shown) to assure the seating of a front passenger. This seat is fixed to the mechanical base structure 11 and is disposed in the portion A of the passenger compartment. In this particular non-limiting case, in the placement of the passenger compartment A, the enclosure 14 is formed in front of this seat in the longitudinal direction X of the arrangement.

The arrangement 10 comprises, as indicated before, a power supply battery (not shown) intended to supply electrical power to an electric traction motor (not shown) of the vehicle. In a particular embodiment, which is not exclusive however, the device for controlling a circuit breaker 12 is connected to said power battery.

The enclosure 14 comprises at least one gasket (not shown) placed between the cover 142 and the housing 141 when the cover 142 assumes its first configuration. Each assembly device 16 comprises clamping elements (not shown in detail) automatically drawing the cover 142 and the housing 141 together as the assembly device 16 passes into the locking state so as to assure that this gasket is compressed.

A strip is left free at the opening formed in the mechanical base structure 11 so as to allow the application of a filler in the zone described before. In addition, an inner trim (carpet, mat, etc.) (not shown) can be fixed above the cover 142 when this is in the first configuration.

Lastly, the enclosure 14 may possibly have a structural function, i.e. of reinforcement in the sense that it helps to form the chassis of the vehicle. The enclosure then has structural elements configured such that the enclosure 14 forms a removable structural portion of the chassis of the vehicle able to be fixed to a non-removable portion of the chassis formed by the mechanical base structure 11 such that the assembly formed by the mechanical base structure 11 and the enclosure 14 fixed in the recess 13 formed in the mechanical base structure 11 forms a structural floor of the chassis in the portion A of the passenger compartment. These structural elements are formed by shaped articles (ribs, reinforcements, bosses, bulges), choices of materials, dimensions and thicknesses suitable for performing a function as defined above.

Thus, a structural enclosure 14 of this type makes it possible to satisfy different demands in case of impacts and passes the "Isofix" validation texts (i.e. it allows the positioning of a stand on the cover 142, which stand is associated with a child seat positioned on the front passenger seat).

Based on the above, it is understood that the arrangement 10 solves the problem of access to and protection of the electrical device for controlling a circuit breaker 12 joined to the power battery for the traction of the vehicle. Thanks to the recess 13 and thanks to the enclosure 14, said device is easily accessible in particular for firefighters, but cannot be accessed too easily, such that a child cannot access said device. On the other hand, the arrangement 10 guarantees the seal and a service life of at least 60 openings of the enclosure 14.

The invention claimed is:

1. An arrangement for an electric traction or hybrid motor vehicle, comprising:
   at least one portion of a passenger compartment of the vehicle;
   a mechanical base structure delimiting a bottom of the portion of the passenger compartment and comprising a recess accessible from the passenger compartment;
   an electrical device controlling a circuit breaker, the device configured to be joined to a power supply battery supplying electrical power to an electric traction motor of the vehicle; an
   an enclosure that contains the device for controlling a circuit breaker and that is fixed in the recess such that the device for controlling a circuit breaker is accessible from the portion of the passenger compartment,
   wherein the enclosure comprises a housing fixed to the mechanical base structure in the recess, the device for controlling a circuit breaker being disposed in the housing, and a cover accessible from the portion of the passenger compartment, the housing and the cover being configured such that the enclosure forms, in a first configuration of the cover, a Faraday cage within which the device for controlling a circuit breaker is placed, and isolates the portion of the passenger compartment from a magnetic field emitted by the device for controlling a circuit breaker.

2. The arrangement as claimed in claim 1, wherein the cover is mounted removably in relation to the housing such that the cover varies between the first configuration and a second configuration, in which, respectively, the cover prevents and allows a person access to the device for controlling a circuit breaker from the portion of the passenger compartment.

3. The arrangement as claimed in claim 2, wherein the housing and the cover and made of a metal material.

4. The arrangement as claimed in claim 3, wherein the enclosure comprises at least one assembly device between the cover and the housing configured to occupy a locking state blocking the cover on the housing in the first configuration of the cover and an unlocking state allowing the cover to pass into the second configuration, the assembly device comprising an electrically conductive element configured to provide an electrical continuity between the housing and the cover in the locking state of the assembly device.

5. The arrangement as claimed in claim 4, wherein the housing and/or the cover comprise zones free from an electrophoretic treatment, and the electrically conductive element is in contact with the zones.

6. The arrangement as claimed in claim 4, wherein the enclosure comprises at least one gasket placed between the cover and the housing in the first configuration of the cover, and the assembly device comprises clamping elements automatically drawing the cover and the housing together as the assembly device passes into the locking state to assure that the gasket is compressed.

7. The arrangement as claimed in claim 2, wherein, from a side opposite the cover, the housing includes an opening communicating between an interior and an exterior of the enclosure and through which part of the device for controlling a circuit breaker passes.

8. The arrangement as claimed in claim 1, further comprising a power supply battery configured to supply electrical power to an electric traction motor of the vehicle, and the device for controlling a circuit breaker is connected to the power battery.

9. The arrangement as claimed in claim 1, wherein the enclosure comprises structural elements configured such that the enclosure constitutes a removable structural portion of the vehicle chassis configured to be fixed to a non-removable portion of the chassis formed by the mechanical base structure such that the assembly formed by the mechanical base structure and the enclosure fixed in the recess formed in the mechanical base structure forms a structural floor of the chassis in the portion of the passenger compartment.

10. The arrangement as claimed in claim 1, wherein the arrangement comprises a seat for a front passenger fixed to the mechanical base structure and disposed in the portion of the passenger compartment, and the enclosure is arranged in front of the seat in a longitudinal direction of the arrangement corresponding to a direction of travel of the vehicle.

11. The arrangement as claimed in claim 1, wherein the at least one portion of a passenger compartment of the vehicle is a front portion of the passenger compartment.

* * * * *